US011738601B2

(12) United States Patent
Blouin et al.

(10) Patent No.: US 11,738,601 B2
(45) Date of Patent: Aug. 29, 2023

(54) TIRE WITH TREAD COMPRISING AN EVOLVING TREAD PATTERN WITH SIPES

(71) Applicant: COMPAGNIE GENERALE DES ETABLISSEMENTS MICHELIN, Clermont-Ferrand (FR)

(72) Inventors: Damien Blouin, Clermont-Ferrand (FR); Quentin Bonneton, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 12 days.

(21) Appl. No.: 16/633,105

(22) PCT Filed: Jul. 11, 2018

(86) PCT No.: PCT/EP2018/068730
§ 371 (c)(1),
(2) Date: Jan. 22, 2020

(87) PCT Pub. No.: WO2019/020368
PCT Pub. Date: Jan. 31, 2019

(65) Prior Publication Data
US 2021/0155046 A1 May 27, 2021

(30) Foreign Application Priority Data
Jul. 25, 2017 (FR) ...................................... 1757039

(51) Int. Cl.
*B60C 11/00* (2006.01)
*B60C 11/12* (2006.01)
(Continued)

(52) U.S. Cl.
CPC ........ *B60C 11/005* (2013.01); *B60C 11/0302* (2013.01); *B60C 11/1204* (2013.01);
(Continued)

(58) Field of Classification Search
CPC ............... B60C 11/0302; B60C 11/005; B60C 11/1281; B60C 11/24; B60C 2011/0025; B60C 2011/1213; B60C 2011/1227
See application file for complete search history.

(56) References Cited

U.S. PATENT DOCUMENTS 4,527,606 A * 7/1985 Kita .......................... B60C 9/20
152/209.5
4,934,424 A * 6/1990 Kojima ................... B60C 11/12
152/209.25
(Continued)

FOREIGN PATENT DOCUMENTS

EP   0 540 340   5/1993
EP   0 914 975   5/1999
(Continued)

OTHER PUBLICATIONS

Machine translation for Japan 63-240405 (Year: 2021).*
Machine translation for Japan 09-193618 (Year: 2022).*
Machine translation for Japan 01-101205 (Year: 2022).*

*Primary Examiner* — Steven D Maki
(74) *Attorney, Agent, or Firm* — Cozen O'Connor

(57) ABSTRACT

A tire having a tread with a plurality of blocks 12 provided with at least one sipe 22 extending from the contact face of said block, and having a width that can vary in the direction of its depth, and known as a complex sipe. The tread has a first layer of material 38 and at least one second layer of material 40 radially on the inside of the first layer, the first layer being formed in a first rubber composition and the second layer being formed in a second rubber composition different from the first composition. The complex sipe 22 and the grooves separating the blocks are formed entirely in the first layer of material 38. Laterally on each side of the complex sipe, the second layer of material 40 extends, when viewed in transverse section in the block, beyond the bottom 30 of the complex sipe in the direction of the contact face of the block.

10 Claims, 3 Drawing Sheets

(51) Int. Cl.
*B60C 11/03* (2006.01)
*B60C 11/24* (2006.01)

(52) U.S. Cl.
CPC .......... *B60C 11/1281* (2013.01); *B60C 11/24* (2013.01); *B60C 2011/0025* (2013.01); *B60C 2011/1213* (2013.01); *B60C 2011/1227* (2013.01)

(56) References Cited

U.S. PATENT DOCUMENTS

| | | | |
|---|---|---|---|
| 6,116,310 A * | 9/2000 | Shinohara | B60C 11/12 152/209.21 |
| 6,408,911 B1 * | 6/2002 | Tanabe | B29D 30/0606 152/209.5 |
| 10,576,790 B2 | 3/2020 | Lee et al. | |
| 2013/0000805 A1 * | 1/2013 | Oodaira | B60C 11/11 152/209.18 |
| 2018/0312006 A1 * | 11/2018 | Bonnet | B60C 9/0064 |
| 2021/0114417 A1 * | 4/2021 | Blouin | B60C 11/1281 |

FOREIGN PATENT DOCUMENTS

| | | |
|---|---|---|
| JP | 63-240405 A * | 10/1988 |
| JP | 01-101205 A * | 4/1989 |
| JP | H 05-5254314 | 10/1993 |
| JP | 09-193618 A * | 7/1997 |
| KR | 101742279 B1 | 5/2017 |
| WO | WO-2017/072139 A1 * | 5/2017 |
| WO | WO 2017/105496 | 6/2017 |
| WO | WO-2017/105496 A1 * | 6/2017 |

* cited by examiner

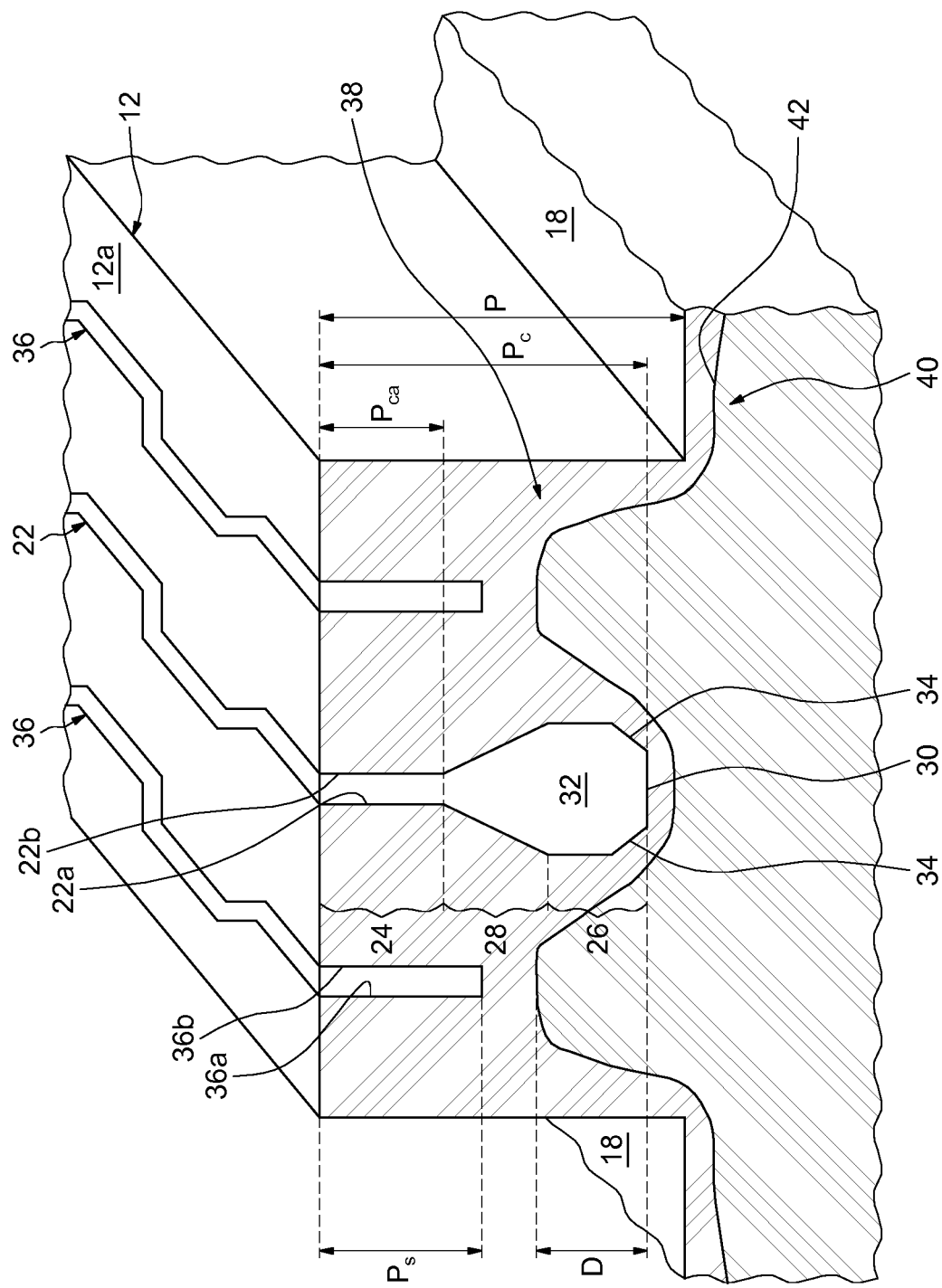

TIRE WITH TREAD COMPRISING AN EVOLVING TREAD PATTERN WITH SIPES

RELATED APPLICATIONS

This is a U.S. National Phase Application under 35 USC 371 of International Application PCT/EP2018/068730 filed on Jul. 11, 2018.

This application claims the priority of French application no. 1757039 filed Jul. 25, 2017, the entire content of which is hereby incorporated by reference.

FIELD OF THE INVENTION

The present invention relates to a tire with a tread comprising an evolving tread pattern with sipes, notably a tire of the snow tire type.

BACKGROUND OF THE INVENTION

A winter tire, also known as the snow tire, comprises a tread provided with a plurality of sipes delimiting thin blades of rubber having edge corners able to bite into the snow when driving on a snow-covered road surface. That improves the grip on a snow-covered road surface.

The action of the edge corners on the road surface is all the greater when the tread is new. This is because, in that state, the blades of rubber have a high slenderness ratio, which is to say a great height for a width that is small relative to this height. Thus, when the blades enter the contact patch in which the tire is in contact with the road surface, they tilt. The pressures that the edge corners of the blades apply to the road surface are therefore increased.

As the tread wears, the height of the blades decreases and the extent to which these blades deform as they enter the contact patch also decreases. As a result, the biting effect of the edge corners decreases with tread wear.

SUMMARY OF THE INVENTION

It will therefore be appreciated that there is a need to improve the grip of snow tires, and to do so even when the tire is in an advanced state of wear.

The invention relates to a tire comprising a tread comprising a plurality of blocks separated when new in the circumferential direction by grooves and provided with contact faces each forming part of the tread surface of said tread.

Each block of said plurality of blocks is provided with at least one sipe extending from said contact face, having a depth Pc and having a width that can vary in the direction of the depth Pc, and known as a complex sipe. Said width is at a maximum in a distal part of said complex sipe.

According to a general feature of the tire, the tread when new comprises a first layer of material delimiting the tread surface and at least one second layer of material radially on the inside of the first layer. The first layer of material is formed in a first rubber composition and the second layer of material is formed in a second rubber composition different from the first rubber composition.

According to another general feature of the tire, the complex sipe and the grooves separating the blocks are formed entirely in the first layer of material. Laterally on each side of the complex sipe, the second layer of material extends, when viewed in transverse section in said block, beyond the bottom of the complex sipe in the direction of the contact face of the block.

A "tire" means all types of resilient tread, whether or not it is subjected to an internal pressure.

The "tread" of a tire means a quantity of rubbery material delimited by lateral surfaces and by two main surfaces, one of which, referred to as the tread surface, is intended to come into contact with a road surface when the tire is being driven on.

A "rubber composition" means a composition comprising at least one elastomer and at least one filler.

A "groove" means a cut generating opposing walls of material. The distance between the walls of material of the groove is such that these walls cannot come into contact with one another under usual running conditions. This distance for a groove may, for example, be greater than 2 millimetres (mm).

A "block" means a raised element delimited by grooves and comprising lateral walls or faces and the contact face intended to come into contact with the road surface during running.

A "sipe" means a cut generating opposing walls of material. The distance or spacing between the walls of material of the sipe is suitable for allowing these walls to come at least partially into contact with one another as they enter the contact patch in which the tire is in contact with the ground.

Each complex sipe is delimited by two opposing walls of material, the spacing between these walls being variable along its depth Pc. In other words, each complex sipe comprises, at a certain depth, an enlargement intended to form a groove.

The enlargements of the complex sipes make it possible to generate grooves on the surface of the tread when this tread reaches a certain level of wear. These grooves constitute reservoirs able to store up snow from a snow-covered road surface or else to remove water from a wet road surface. This makes it possible to improve the grip of the tire on a snow-covered road surface on a wet road surface, when the tread reaches an advanced state of wear.

Furthermore, the particular arrangement of the second layer of material with respect to the bottoms of the complex sipes further encourages the achievement of good grip on snow or on a wet road surface when the tread has reached a predetermined certain level of wear. When this predetermined level of wear is reached, the tread surface of the tread is formed both by the first layer of material and by the second layer of material.

For example, the rubber composition of the second layer of material may be specially adapted to prioritize grip on snow over grip on a wet road surface, or vice versa. The rubber composition of the first layer of material may for example be suited to obtaining a balance between grip on snow and grip on a wet road surface.

The enlargements of the complex sipes associated with the appearance of the second layer of material on the tread surface of the tread make it possible to prolong the characteristics favourable to grip on snow-covered ground on wet ground, despite the advanced level of tread wear.

The level of wear that triggers the appearance of the second layer of material on the tread surface of the tread can be adjusted. For preference, the radial distance separating the bottom of said complex sipe and the top of the second layer of material situated laterally on each side of the complex sipe is comprised between 1.5 mm and 5 mm.

Moreover, the first layer of material on the top that delimits the tread surface also has the effect of protecting the second layer of material underneath, notably at the bottom of the grooves separating the blocks. The rubber composition of the first layer of material can be specially designed notably to resist external attack, for example the ingress of stones, ageing, and cracking. The first layer of material which completely protects the second layer of material when the tire is new, and then which in part protects this second layer when the tire is worn, makes it possible to obtain a tire with good integrity over time.

According to one advantageous particular embodiment, when considering the transverse section, the second layer of material extends laterally on each side of the complex sipe beyond the height T of a wear indicator projecting from the bottom of one of the grooves.

The interface between the first and second layers of material may have a wavy profile.

Advantageously, each portion of the second layer of material situated beyond the bottom of said complex sipe extends into said block along the majority of the portion of the first layer of material that surrounds said complex sipe.

The difference between the complex dynamic shear modulus G* (23° C., 10%, 10 Hz) of the first rubber composition and that of the second rubber composition may be comprised between 0 and 40%, preferably comprised between 10 and 30%.

The "complex modulus" G* is defined by the following relationship: $G^* = \sqrt{(G'^2 + G''^2)}$ in which G' represents the elastic modulus and G'' represents the viscous modulus. The phase angle δ between the force and the displacement, expressed as a dynamic loss tan(δ) is equal to the ratio G''/G'. The terms complex modulus, elastic modulus and viscous modulus refer to dynamic properties well known to those skilled in the art.

These properties are measured on a viscosity analyser of Metravib VA4000 type on vulcanized test specimens.

The measurements of dynamic properties are performed as follows:

1—the Bonded Test Specimen (Taken from the Tire or from a Vulcanized Sheet).

These properties are measured on bonded test specimens taken from the tread of a tire or from a vulcanized sheet. Test specimens such as those described in standard ASTM D 5992-96 (version published in September 2006, initially approved in 1996), Figure X2.1 (circular version) are used. The diameter "d" of the test specimen is 10 mm, with a tolerance of 0 mm to +0.04 mm, (it therefore has a circular cross section of 78.5 mm2), the thickness "L" of each of the portions of rubber composition is 2 mm, with a thickness tolerance of −0.15 mm to +0.20 mm, giving a "d/L" ratio of 5.

2—Temperature Sweep Measurement with Imposed Stress

The response of a sample of vulcanized rubber composition subjected to a simple alternating sinusoidal shear stress at a frequency of 10 Hz with an imposed stress (of 0.7 MPa) symmetrically about its equilibrium position is recorded. The test specimen is made to undergo accommodation prior to the temperature sweep measurement. The test specimen is for that purpose subjected to sinusoidal shear stress loading at 10 Hz, at 100% full-scale deformation, at 23° C.

The temperature sweep measurements are taken on a temperature curve increasing by 1.5° C. per minute, from a temperature $T_{min}$ below the glass transition temperature $T_g$ of the material up to a temperature $T_{max}$ which may correspond to the rubber plateau of the material. Before beginning the sweep, the test specimen is stabilized at the temperature $T_{min}$ for 20 minutes in order to have a uniform temperature throughout the test specimen. The results exploited at the chosen temperature and the chosen stress are generally the dynamic complex shear modulus G*, comprising an elastic part G', a viscous part G'' and the phase angle δ between the force and the displacement, expressed as a loss factor tan(δ), equal to the ratio G''/G'. The glass transition temperature $T_g$ is the temperature at which the dynamic loss tan(δ) reaches a maximum during the temperature sweep. Thus, this method makes it possible to determine the glass transition temperature $T_g$ of the rubber composition.

3—Deformation Sweep at Constant Temperature

This method makes it possible to determine the complex dynamic shear modulus G*. The response of a sample of vulcanized rubber composition subjected to a simple alternating sinusoidal shear stress at a frequency of 10 Hz symmetrically about its equilibrium position, and at a stabilized temperature of 23° C. is recorded. The measurement is made up of 2 successive phases: a sweep across the whole range of the deformations from the smallest to the highest from 0.1% to 50% full scale (outward cycle) followed by a sweep across the whole range of deformations from the highest to the lowest 50% to 0.1% full scale (return cycle). Before beginning the measurement, a period of 15 mins of stabilizing the test specimen at the measurement temperature is applied. The results exploited are the dynamic complex shear modulus G*, comprising an elastic part G', a viscous part G'' and the phase angle δ between the force and the displacement, expressed as a loss factor tan(δ), equal to the ratio G''/G'. These various descriptors can be extracted at the desired deformation, such as, for example, the G* (23° C., 10%, 10 Hz).

In order to further encourage the obtaining of good grip properties on snow at the end of life, the difference in the glass transition temperature between the first rubber composition and the second rubber composition is, in terms of absolute value, comprised between 4° C. and 30° C., and preferably comprised between 5° C. and 10° C.

In order to optimize the performance of the tire on a wet road surface at the end of life, said complex sipe may extend substantially parallel to two of the grooves that delimit said block. This is because such an orientation encourages the removal of water by the complex sipes.

In one particular embodiment, the bottom of the distal part of said complex sipe is connected, in said view in cross section, by a fillet to each of the walls of rubber delimiting said sipe. Such an orientation optimizes the mouldable nature of the sipe.

Advantageously, said complex sipe comprises a proximal part which extends from the contact face of said block and which has a substantially constant width.

Said complex sipe may comprise an intermediate joining part connecting the proximal part to the distal part and having a width that varies progressively along its depth. The generation of cracks in the region of rubber adjacent to said complex sipe is thus limited. Alternatively, it is possible to make provision for the proximal part to extend the distal part of said complex sipe directly.

In one embodiment, said complex sipe, when the tread is new, forms a wavy trace on the contact face of said block. In this way, the stiffness of the block as it enters the contact patch in which it is in contact with the ground is optimized as a result of the mechanical immobilization achieved by the wavy trace. The wavy trace may for example have a square-wave shape.

For preference, said complex sipe divides said block into two substantially identical block parts. What is meant by "two substantially identical block parts" is that the difference in surface area between the contact faces of these two block parts is less than 10%. This encourages uniform wearing of said block.

In one particular embodiment, each block of said plurality of blocks is further provided with at least one sipe extending from the contact face of said block, having a depth Ps less than the depth Pc of said complex sipe and having a width that is substantially constant in the direction of the depth Ps, known as a simple sipe. The distal part of said complex sipe extends at least in part beyond said simple sipe.

With this particular design of tire tread, two different types of sipe are provided, namely the simple sipes and the complex sipes.

Each simple sipe is delimited by two opposing walls of material, and has a substantially constant width that is along its entire depth Ps. In other words, the spacing between the walls of material of each simple sipe is substantially constant.

By adding the simple sipes to the complex sipes additional edge corners are created and the effect of biting into the snow at the beginning of the life of the tire is accentuated. Because the complex sipes extend into the depth of the blocks beyond the simple sipes, these simple sipes will not significantly reduce the stiffness of the blocks of rubber at the end of life that are equipped with the surface grooves formed by the enlargement of the complex sipes.

Thus, the tread of the tire exhibits good grip on snow at the beginning of life without this performance being degraded at the end of life.

For preference, laterally on each side of said complex sipe, the second layer of material extends, when viewed in cross section, beyond the bottom of said complex sipe in the direction of the contact face of said block, while at the same time remaining distant from the bottom of said simple sipe. In other words, said simple sipe is formed entirely in the first layer of material of the tread.

In one embodiment, said simple sipe, when the tread is new, forms a wavy trace on the contact face of said block. The wavy trace formed by said simple sipe may for example have a shape identical to the wavy trace formed by said complex sipe.

Alternatively or in combination, said simple sipe and/or said complex sipe may exhibit undulating waves into the depth of said block.

Each block of said plurality of blocks may comprise a plurality of simple sipes, said complex sipe being positioned between two simple sipes.

Advantageously, the tread is directional. What is meant by a "directional tread" is a tread the behavioural characteristics of which are optimized for a predetermined direction of rotation.

In the foregoing description and the description which will follow, the endpoints indicated for a range of values are included within this range, particularly in the expressions "comprised between".

BRIEF DESCRIPTION OF THE DRAWINGS

The present invention will be better understood from reading the detailed description of an embodiment considered by way of entirely non-limiting example and illustrated by the appended figures, in which:

FIG. 5 is a view in section on the axis V-V of FIG. 1.

DETAILED DESCRIPTION OF THE DRAWINGS

Figure 1:
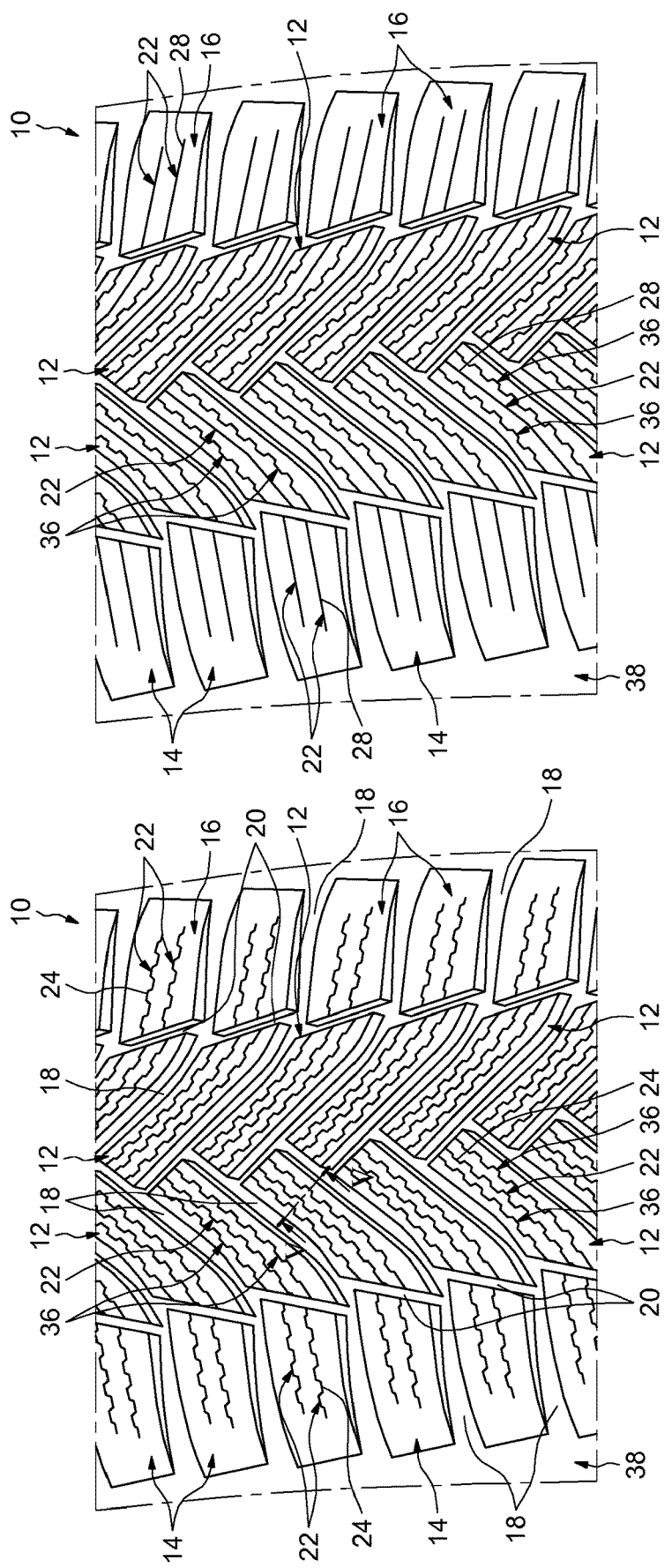
FIG. 1 is a partial perspective view of a tread of a tire when new, according to one exemplary embodiment of the invention.

FIG. 1 partially depicts a tread 10 of a tire when new, comprising a plurality of blocks 12 to 16. In the figure, the blocks referenced 12 are those situated in the central part of the tread 10, and the blocks referenced 14 and 16 are those situated in the lateral parts of the tread.

Several grooves 18, 20 are formed on the tread 10 and delimit the blocks 12 to 16. When considering the axis of rotation of the tire, the grooves 18 separate the blocks 12 to 16 in the circumferential direction, while the grooves 20 separate these blocks in the axial direction. These grooves 20 extend in a zigzag in the circumferential direction. That makes it possible to avoid phenomena whereby the tread 10 buckles under the effect, and makes it possible to maintain a more constant tread stiffness, notably under high lateral stress loadings under cornering. As a preference, unlike the grooves 18, the width of the grooves 20 is less than 2 mm, and so these grooves 20 can close up as they enter the contact patch in which they are in contact with the ground.

In one embodiment, said complex sipe, when the tread is new, forms a wavy trace on the contact face of said block. In this way, the stiffness of the block as it enters the contact patch in which it is in contact with the ground is optimized as a result of the mechanical immobilization achieved by the wavy trace.

The depths P of the main grooves 18, 20 may be equal to one another or different. In the exemplary embodiment illustrated, the blocks 12 to 16 constitute a tread pattern in the overall shape of a V, giving the tread 10 a preferred direction of running.

Each block 12 to 16 comprises a contact face that forms part of the tread surface of the tread 10, this contact face being intended to come into contact with a road surface during running. Each block 12 to 16 comprises a plurality of sipes 22, 36 extending into the thickness of said block from the contact face. Each sipe 22, 36 extends over this contact face in a given direction of extension. When considering the axis of rotation of the tire, this direction of extension has a circumferential component and an axial component. Depending on the values adopted by the circumferential component and by the axial component, the sipe may be said either to be transverse (circumferential component zero) or circumferential (axial component zero) or else oblique (circumferential and axial components non-zero). In the exemplary embodiment illustrated, the sipes 22, 36 are transverse and oblique.

FIG. 5 is a view in transverse cross section of a block 12 of the central part of the tread of FIG. 1. The block 12 comprises a sipe 22 extending from the contact face 12a and having a depth Pc. The width of the sipe 22 is variable in the direction of the depth Pc. In the remainder of the description, this sipe 22 will be referred to as a complex sipe. The complex sipe 22 is delimited by two opposing walls 22a, 22b of material, the spacing between these walls being variable along the depth Pc. The depth Pc of the complex sipe 22 is less than the depth P of the grooves 18. By way of indication, the depth Pc may be less than the depth P of the grooves 18 by at least 0.5 mm. The depth Pc of the complex sipe 22 may for example be comprised between 6 mm and 10 mm.

The complex sipe 22 comprises a proximal part 24 extending from the contact face 12a and having a constant width, a distal part 26 which defines the maximum width of said sipe, and a joining part 28 connecting the proximal part 24 to the distal part 26. The bottom 30 of the distal part forms the bottom of the complex sipe 22.

The proximal part 24 of the complex sipe extends radially from the contact face 12a and has a depth Pca. The width of the proximal part 24 is constant along the depth Pca. The proximal part 24 extends in a straight line in the depth of the block 12.

Below the depth Pca, the complex sipe 22 widens to define a depression or enlargement 32. The complex sipe 22 has a shape referred to as a "teardrop" shape. The enlargement 32 is formed by the joining part 28 and by the distal part 26. The distal part 26 of the complex sipe has a width that is constant overall. The bottom 30 of the distal part is connected by a fillet 34 to each wall 22a, 22b of material of the sipe. The width of the joining part 28 is at a minimum in the region of connection to the proximal part 24 and at a maximum in the region of connection to the distal part 26. The variation in the width of the joining part 28 is progressive along its depth.

In the exemplary embodiment illustrated, the block 12 also comprises sipes 36 extending from the contact face 12a in a straight line into the depth of the block 12. The sipes 36 are identical to one another and in this instance there are two of them. Each sipe 36 has a depth Ps. The width of each sipe 36 is constant in the direction of the depth Ps. In the remainder of the description, the sipe 36 will be referred to as simple sipes. Each simple sipe 36 is delimited by two opposing walls 36a, 36b of material, the spacing between these walls being constant along the depth Ps. The depth Ps of the simple sipes 36 is less than the depth Pc of the complex sipe 22. The depth Ps of the simple sipes 36 is greater than the depth Pca of the proximal part 24 of the complex sipe. The depth Ps of the simple sipes 36 does not extend beyond half the depth of the joining part 28. By way of indication, the depth Ps of the simple sipes 36 may for example be comprised between 2 mm and 6 mm.

In the exemplary embodiment illustrated, the complex sipe 22 is positioned in such a way as to divide the block 12 into two substantially identical block parts. The complex sipe 22 is arranged between the two simple sipes 36. With reference once again to FIG. 1, the sipes 22, 36 in this instance extend across the entire width of the block 12 concerned. Each sipe 22, 36 opens onto lateral faces of the block 22 which are delimited by the grooves 18, 20. Each sipe 22, 36 extends substantially parallel to the grooves 18 that delimit the block 12 in the circumferential direction. In the exemplary embodiment illustrated, each sipe 22, 36 when new forms a wavy trace on the contact face 12a of the block.

As can be seen in FIG. 5, the tread when new comprises a first layer of material 38 delimiting the contact face 12a, and a second layer of material 40 radially on the inside of said first layer. The first and second layers of material 38, 40 are in contact with one another. The first and second layers of material 38, 40 are made respectively from a first and second rubber compositions which are different from one another. The sipes 22, 34 and the grooves 18 and 20 (FIG. 1) are formed entirely in the first layer of material 38.

When considering the view in transverse section of the block 12 in this FIG. 5, the second layer of material 40 of the tread extends on the inside of the block beyond the bottom 30 of the complex sipe in the direction of the contact face 12a of said block, and does so laterally on each side of the sipe. The second layer of material 40 rises radially towards the contact face 12a, while still remaining some distance away from the bottom of the simple sipes 36. In the exemplary embodiment illustrated, the second layer of material 40 rises up along each side of the complex sipe 22 as far as the joining part 28 of the sipe. As an alternative, the second layer of material 40 may rise up along each side of the complex sipe 22 only as far as the distal part 26 of the sipe.

Inside the block 12, the upper generatrix of the second layer of material 40 has a wavy profile comprising an alternation of peaks and of troughs. A peak of the upper generatrix of the second layer of material 40 is situated between the complex sipe 22 and each lateral face of the block 12, which face is delimited by one of the grooves 18. By way of indication, the radial distance D separating the bottom 30 of the complex sipe and each of these two peaks of the upper generatrix of the second layer of material 40 is comprised between 1.5 mm and 5 mm.

One trough of this upper generatrix is situated radially under the bottom 30 of the complex sipe 22. Another trough of the upper generatrix is situated in the vicinity of the base of each lateral face of the block 12, which face is delimited by one of the grooves 18. An interface 42 is formed between the first layer of material 38 and the second layer of material 40 of the tread. More specifically, the interface 42 is formed by the upper generatrix of the second layer of material 40 and the lower generatrix of the first layer of material 38. The interface 42 has a substantially sinusoidal wavy profile.

In the exemplary embodiment illustrated, each block 12 of the central part of the tread comprises one complex sipe 22 and two simple sipes 36. The blocks 14, 16 of the lateral parts of the tread comprise only complex sipes 22.

As indicated previously, FIG. 1 depicts the tread 10 when the tire is new. The height of the blocks 12 to 16 when new may for example be comprised between 6 mm and 10 mm.

Figure 2:
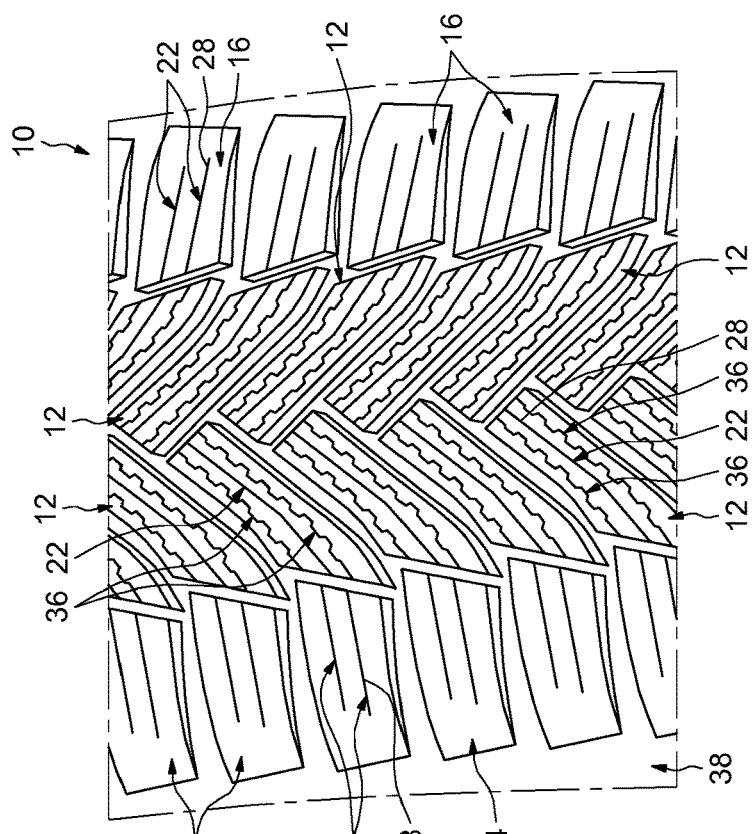
FIGS. 2 to 4 are partial perspective views of the tread of the tire of FIG. 1 according to different levels of wear.

FIG. 2 depicts the tread 10 with a first level of wear. This level of wear corresponds to a wear greater than the depth Pca of the complex sipes 22 and less than the depth Ps of the simple sipes 36. When this level of wear is reached, the joining parts 28 of the complex sipes open onto the tread surface of the tread 10. The tread surface remains formed exclusively by the first layer of material 38. This first level of wear may for example correspond to a height of the blocks 12 to 16 equal to 6 mm.

Figure 3:
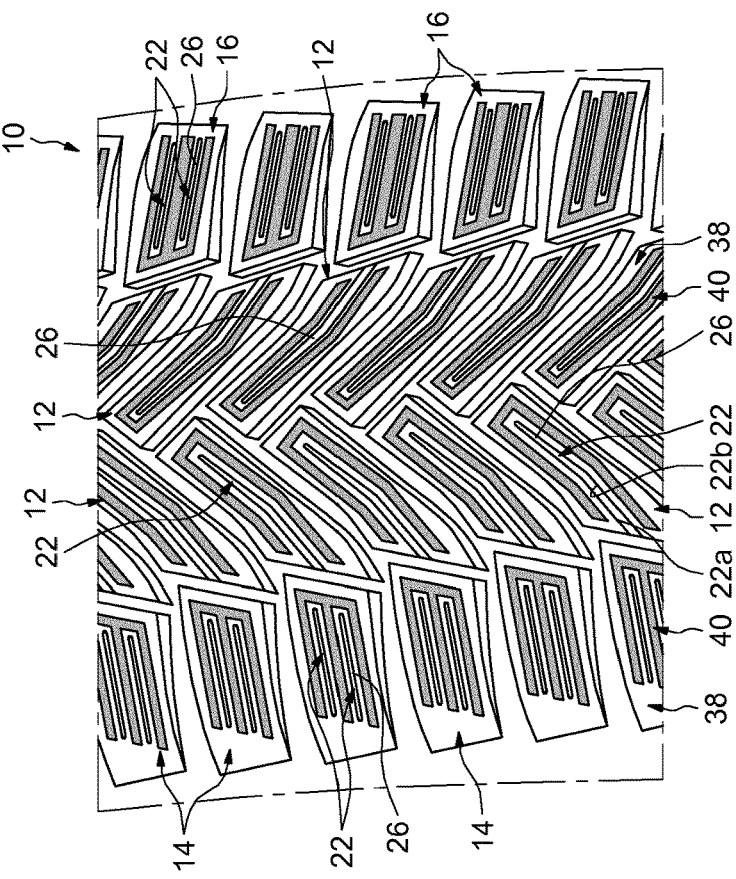

FIG. 3 depicts the tread 10 at a second level of wear corresponding to wear that is between the bottom of the simple sipes 36 and the interface 42 between the first and second layers of material 38, 40 (FIG. 5). When this level of wear is reached, only the joining parts 28 of the complex sipes open onto the tread surface of the tread 10. The first layer of material 38 still delimits the tread surface. This second level of wear may for example correspond to a height of the blocks 12 to 16 equal to 4 mm.

Figure 4:
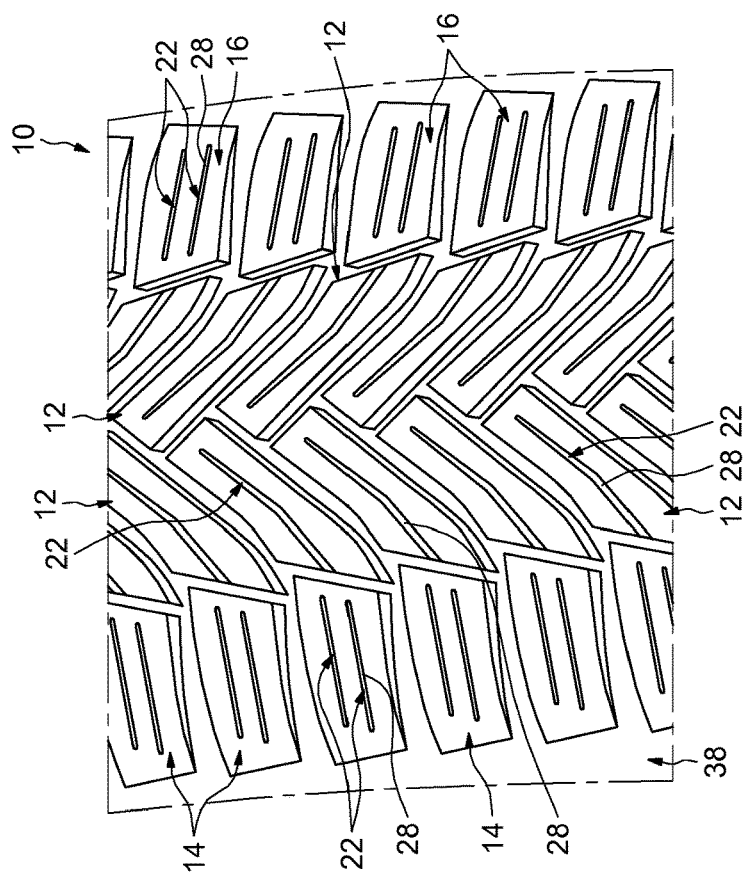

FIG. 4 depicts the tread 10 according to a third level of wear which corresponds to wear between the interface 42 and the bottom 30 of the complex sipes (FIG. 5). This third level of wear corresponds to an advanced level of wear, close to the end of wearing life, in which the thickness of the tread has reached the regulation height T of a wear indicator (not depicted) of this tread. In the case of a tire for a passenger vehicle, this regulation height is 1.6 mm. The third level of wear illustrated in FIG. 4 may for example correspond to a height of the blocks 12 to 16 equal to 2.1 mm.

When this third level of wear is reached, only the joining parts 28, or the distal parts 26, of the complex sipes open onto the tread surface of the tread 10. In FIG. 4, the level of wear illustrated triggers the appearance of the distal parts 26 of the complex sipes on the tread surface. For this level of wear, the first layer of material 38 together with the second layer of material 40 delimits the tread surface of the tread 10.

In FIG. 4, the second layer of material 40 has been depicted in grey for the sake of clarity.

At this tread surface, when considering one of the blocks 12, an internal portion of the first layer of material 38 extends along the walls 22a, 22b of the distal part 26 of each sipe 22 and surrounds these walls. The second layer of material 40 extends along the block 12 and surrounds this internal portion of the first layer of material 38 and is itself surrounded by a peripheral portion of the first layer of material.

As indicated previously, when the level of wear illustrated in FIG. 4 is reached, the tread surface of the tread 10 is formed both by the first layer of material 38 and by the second layer of material 40.

The rubber composition of the second layer of material 40 is advantageously suited to favouring grip on snow or on a wet road surface. The rubber composition of the first layer of material 38 may, for its part, be especially suited to favouring resistance to wearing.

By way of indication, the difference in glass transition temperature $T_g$ between the first rubber composition of the first layer of material 38 and the second rubber composition of the second layer of material 40 is, in absolute value, comprised between 4° C. and 30° C., and preferably comprised between 6° C. and 10° C. In one particular embodiment, the glass transition temperature $T_g$ of the first rubber composition may for example be equal to −25° C. and the glass transition temperature $T_g$ of the second rubber composition may for example be equal to −31° C.

Nonlimitingly, the tread may comprise a sublayer in contact with the second layer of material. By way of example, this sublayer is a low-loss sublayer comprising a rubber composition having hysteresis losses (P60) of between 9 and 20 and a Shore A hardness of between 60 and 68.

Embodiments of the invention have been illustrated on the basis of a tire comprising a directional tread. It does not constitute a departure from the scope of the present invention when the tire comprises another type of tread.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire comprising: a tread comprising a plurality of blocks separated when new in the circumferential direction by grooves and provided with contact faces each forming part of the tread surface of said tread, each block of said plurality of blocks being provided with at least one sipe extending from said contact face, having a depth Pc and having a width that can vary in the direction of the depth Pc, and known as a complex sipe, said width being at a maximum in a distal part of said complex sipe, wherein the tread when new comprises a first layer of material delimiting the tread surface and at least one second layer of material radially on the inside of said first layer, the first layer of material being formed in a first rubber composition and said second layer of material being formed in a second rubber composition different from the first rubber composition, wherein said complex sipe and the grooves separating the blocks are formed entirely in the first layer of material, the first layer of material being formed in one single rubber composition, wherein said complex sipe and the grooves are separated apart from the second layer of material through the first layer of material, wherein said complex sipe comprises a proximal part which extends from the contact face of said block and which has a substantially constant width, and an intermediate joining part connecting the proximal part to the distal part, wherein the intermediate joining part of said complex sipe has a width that varies progressively along its depth, and the distal part which defines the maximum width of said complex sipe has a width that is constant overall, wherein each block of said plurality of blocks is further provided with two sipes each extending from the contact face of said block and having a width that is substantially constant in the direction of a depth Ps, known as a simple sipe wherein said two simple sipes each have the depth Ps greater than the depth of the proximal part and less than half the depth of the intermediate joining part of said complex sipe, wherein said complex sipe of each block divides said block into two substantially identical block parts, wherein said complex sipe is positioned between said two simple sipes, and wherein laterally on each side of said complex sipe, the second layer of material extends, when viewed in transverse section in said block, beyond a bottom of said complex sipe in the direction of the contact face of said block and rises up as far as the joining part of said complex sipe while remaining distant from a bottom of the simple sipe.

2. The tire according to claim 1, wherein the radial distance separating the bottom of said complex sipe and the top of the second layer of material situated laterally on each side of said complex sipe is comprised between 1.5 mm and 5 mm.

3. The tire according to claim 1, wherein the interface between the first and second layers of material has a wavy profile.

4. The tire according to claim 1, wherein each portion of the second layer of material situated beyond the bottom of said complex sipe extends into said block along the majority of the portion of the first layer of material that surrounds said complex sipe.

5. The tire according to claim 1, comprising at least one tread wear indicator of height T projecting from a bottom of one of the grooves, and in which, laterally on each side of said complex sipe, the second layer of material extends, when viewed in transverse section in said block, beyond the height T of the wear indicator.

6. The tire according to claim 1, wherein the difference in glass transition temperatures between the first rubber composition and the second rubber composition is, in terms of absolute value, comprised between 4° C. and 30° C., or between 5° C. and 10° C.

7. The tire according to claim 1, wherein the difference between the complex dynamic shear modulus G* (23° C., 10%, 10 Hz) of the first rubber composition and that of the second rubber composition is comprised between 0 and 40%, or comprised between 10 and 30%.

8. The tire according to claim 1, wherein said complex sipe extends substantially parallel to two of the grooves that delimit said block.

9. The tire according to claim 1, wherein said complex sipe, when the tread is new, forms a wavy trace on the contact face of said block.

10. The tire according to claim 1, wherein the tread is directional.

\* \* \* \* \*